United States Patent [19]
Bobrowski

[11] Patent Number: 5,094,334
[45] Date of Patent: Mar. 10, 1992

[54] MECHANICALLY DRIVEN AUGER SYSTEM

[76] Inventor: Reinhold Bobrowski, P.O. Box 759, Morris, Manitoba, Canada, R0G 1K0

[21] Appl. No.: 409,657

[22] Filed: Sep. 18, 1989

[51] Int. Cl.⁵ .............................................. B65G 21/10
[52] U.S. Cl. .................................. 198/314; 198/667; 198/668
[58] Field of Search ............... 198/666, 667, 668, 314, 198/608, 301, 313, 625, 659, 675, 550.1; 74/417, 423, 385, 396

[56] References Cited
U.S. PATENT DOCUMENTS

| | | | |
|---|---|---|---|
| 1,906,247 | 5/1933 | Buff | 198/675 |
| 2,397,420 | 3/1946 | Jorgensen | 198/314 |
| 2,417,020 | 3/1947 | Shugart | 198/311 X |
| 2,867,314 | 1/1959 | Hansen | . |
| 3,465,685 | 9/1969 | Sherrod | . |
| 3,580,389 | 5/1971 | Nonnenmacher | 198/625 |
| 3,598,224 | 8/1971 | Oury | 198/301 |
| 3,707,244 | 12/1972 | Rastoin | 198/659 |
| 3,771,643 | 11/1973 | Schmidth | 198/550.1 |
| 4,274,790 | 6/1981 | Barker | 198/668 X |
| 4,624,357 | 11/1986 | Oury et al. | 198/313 |
| 4,875,820 | 10/1989 | Lepp et al. | 198/668 X |

Primary Examiner—H. Grant Skaggs
Assistant Examiner—Keith L. Dixon
Attorney, Agent, or Firm—Adrian D. Battison; Stanley G. Ade; Murray E. Thrift

[57] ABSTRACT

An auger system comprises a main auger with a longitudinal auger flight extending from a container at the bottom of the main auger to a discharge spout at the top of the main auger. The lower end of the main auger is connected by a hitch member to a tractor and the lower end of the main auger flight is connected to a PTO shaft of the tractor. A side load auger extends from a hopper at the lower end to a discharge spout connecting into the container at the lower end of the main auger. A mechanical drive connection extends from the main auger shaft to the feed auger shaft and comprises a chain drive coupling driving a second shaft parallel to the main auger shaft at a position above the main auger shaft. Two right angle gear boxes are mounted with one inside the container and the other inside the discharge spout of the side load auger. The gear boxes are connected so that the second shaft drives the input shaft of the container gear box which in turn drives the input shaft of the spout gear box through a universal coupling. The universal coupling also provides physical support for the spout relative to the container. The mechanical drive system reduces horsepower requirement and also provides a fixed drive ratio between the side load auger and the main auger to maximize the feed capacity of the main auger.

11 Claims, 3 Drawing Sheets

1

MECHANICALLY DRIVEN AUGER SYSTEM

BACKGROUND OF THE INVENTION

This invention relates to an auger arrangement for transporting particulate material of the type comprising a main auger including a main auger tube which is supported on a frame system with ground wheels so that the main auger can be moved across the ground. The main auger tube has a hitch at the lower end for connection of the lower end to a tractor. The main auger flight has a coupling at the lower end for connection to a PTO shaft from the tractor so that the main auger flight is directly driven by the PTO shaft. A side load auger is provided to communicate the feed material from a hopper at a lower end of the side load auger into a container at the lower end of the main auger. The side load auger must be free to pivot relative to the container and relative to the main auger so that it can move to various different positions at one side of the main auger so that the hopper can be properly positioned to receive the material to be transported. In addition the side auger is conventionally pivoted to a raised position alongside the main auger for a transport operation.

Augers of this type have been available since approximately 1983 and have become widely adopted.

Conventionally the side load auger is driven by a hydraulic motor mounted at the upper end of the side load auger and powered from the hydraulic system of the tractor. This necessitates the use on the auger of a relatively modern high power tractor since the inefficiency of the hydraulic system requires a high level of horsepower for driving the side load auger. The farmer is therefore obliged to use a tractor for this purpose which could otherwise be more effectively used where the high level of horsepower necessary can be fully utilized.

In addition the fact that the side load auger and the main auger are driven entirely separately makes it very difficult to balance the relative feed speeds of these augers so that it is most likely that either the main auger is overloaded because the side load auger is feeding too quickly or it is underloaded because the side load auger is feeding too slowly. In the former case, spillage or even damage to the equipment can occur. In the second case, the feed capacity of the main auger is not properly utilized so that the whole system feeds well below capacity.

A search has revealed the following U.S. patents which disclose various arrangements for driving two augers one of which can feed into the other. However none of these arrangements have the required pivotal connection between the augers which is necessary to accommodate the movements of the feed auger or side load auger of the system with which the present invention is concerned. The U.S. patent located are U.S. Pat. Nos. 3,771,643 (Schmidth), 4,624,357 (Oury), 1,906,247 (Buff), 3,580,389 (Nonnehmacher), 3,598,224 (Oury), 3,707,224 (Rastoin), 2,867,314 (Hansen) and 3,465,685 (Sherrod).

SUMMARY OF THE INVENTION

It will be noted that it is one object of the present invention therefore to provide an auger arrangement of this general type which overcomes the problems and disadvantages set out above.

According to the invention, therefore, it is provided an auger arrangement for transporting particulate material comprising a main auger having a main auger tube, a main auger flight mounted within the tube, a discharge spout at an upper end of the tube and a container surrounding an inlet portion of the main auger flight at a lower end of the tube, frame means for supporting the tube with said upper end raised relative to said lower end and for movement across the ground, a hitch member for connection of the lower end of the main auger tube to a tractor vehicle for movement of the main auger tube on said frame means by the tractor vehicle, drive coupling means for connection to a drive shaft of the tractor vehicle, first mechanical connection means communicating drive from said coupling means to said main auger flight, a feed auger having a feed auger tube, a feed auger flight, a hopper at a feed end of the feed auger tube for receiving the particulate material and a downwardly depending discharge spout at a discharge end of the feed auger tube, means mounting the feed auger tube on the main auger such that the discharge spout of the feed auger tube is arranged to discharge into the container for feeding the main auger flight, the mounting means being arranged to allow pivotal movement of the feed auger tube relative to the container, and second mechanical connection means communicating drive from said coupling means to said feed auger flight.

The problem is therefore overcome by providing a mechanical drive connection which communicates drives strictly mechanically preferably by way of a pair of right angle gear boxes from the drive coupling to the PTO shaft of the tractor to the upper end of the side load or feed auger.

Preferably one of the gear boxes is fixedly mounted inside the container while the other of the gear boxes is fixedly mounted within the discharge spout of the feed auger. The mechanical connection therebetween can therefore provide both the communication of drive to the feed auger and also the physical support for the feed auger and the discharge spout thereof relative to the container.

With the foregoing in view, and other advantages as will become apparent to those skilled in the art to which this invention relates as this specification proceeds, the invention is herein described by reference to the accompanying drawings forming a part hereof, which includes a description of the best mode known to the application and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
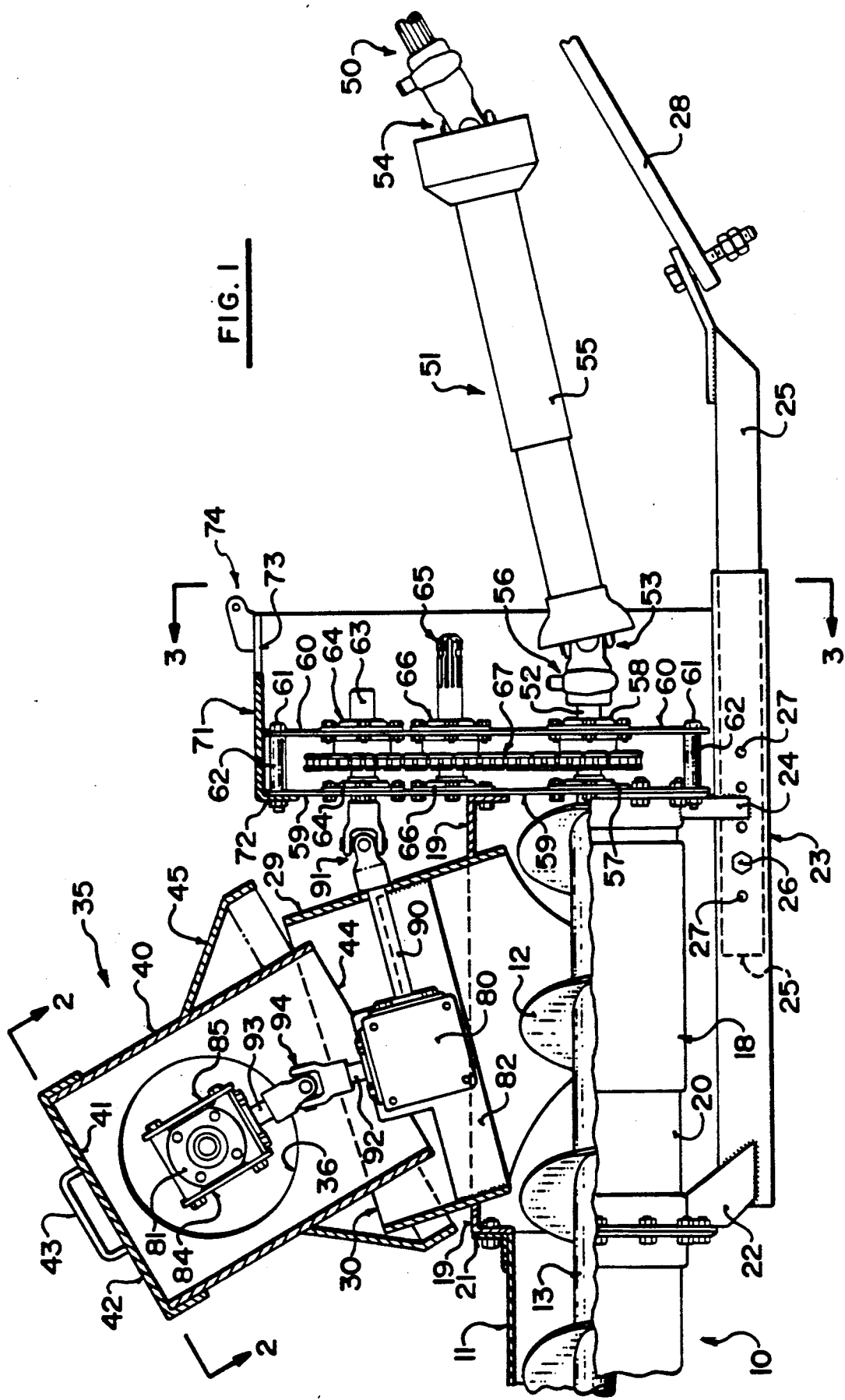
FIG. 1 is a longitudinal cross-sectional view of an auger system according to the present invention.
Figure 2:
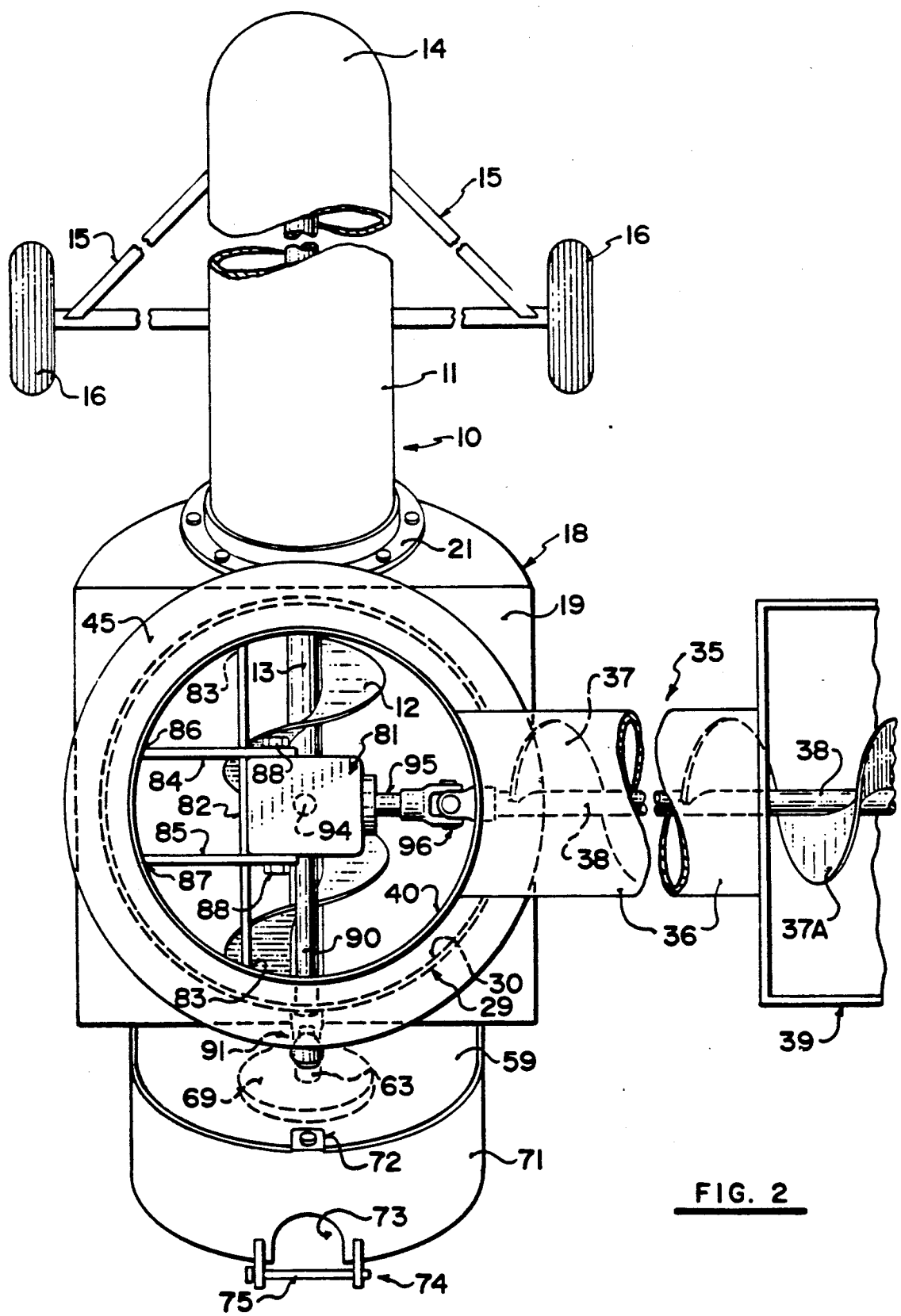
FIG. 2 is a view along the lines 2—2 of FIG. 1 with the cover of the discharge spout of the feed auger removed and with the PTO coupling shaft and hitch omitted for convenience of illustration.
Figure 3:
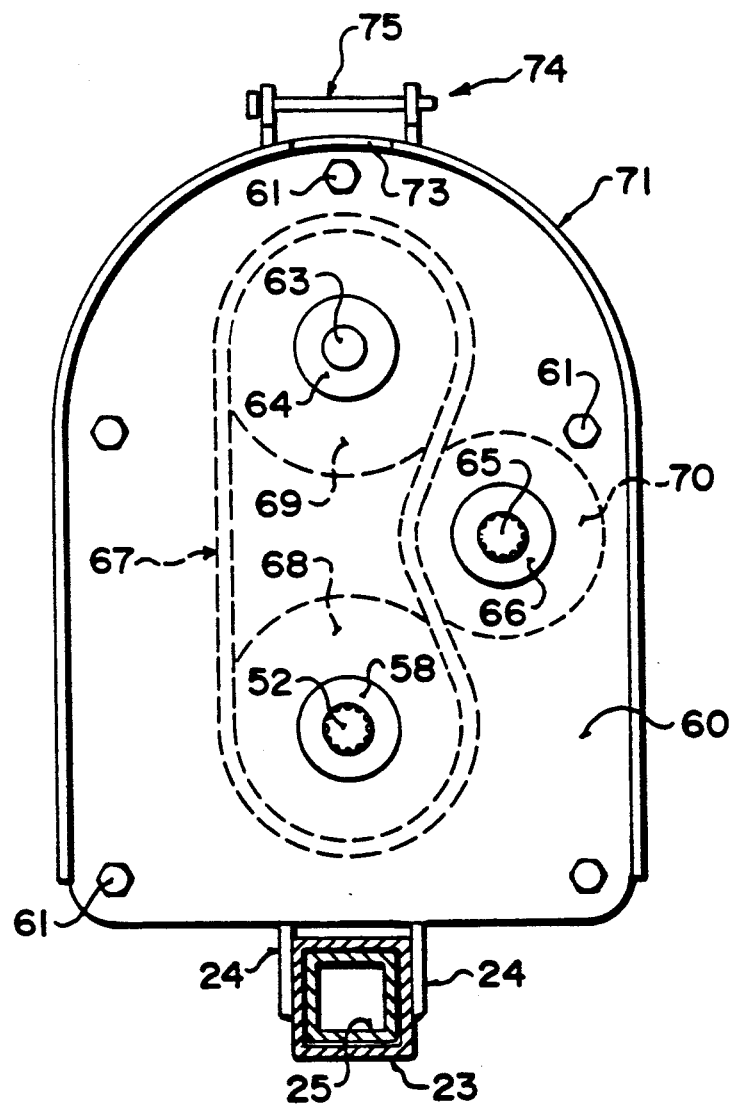
FIG. 3 is view along the lines 3—3 of FIG. 1.

The auger system shown in FIGS. 1, 2 and 3 comprises a main auger generally indicated at 10 including an auger tube 11 and a main auger flight 12. The auger flight is of conventional construction including a shaft 13 and a helical screw thread surrounding the shaft which operates in well known manner to transport the material along the length of the tube by rotation of the shaft about its axis. At an upper end of the main auger is provided a discharge spout schematically shown in FIG. 2 and indicated at 14. The main auger tube is supported for transportation across the ground on a frame structure schematically indicated on small scale at 15 including ground wheels 16. As is well known the frame structure can be adjusted in height to raise and lower the discharge spout 14 relative to the ground but the details of the adjustment mechanism are not shown as these will be apparent to one skilled in the art and can vary according to various different design parameters as required.

A lower end of the tube 11 is connected to a container 18 which has a substantially flat top surface 19 which is wider than the diameter of the tube 11 and a smoothly curved under surface 20. The lowermost portion of the under surface 20 follows the line of the under surface of the tube 11 so the flight rests against the under surface and is confined thereby and extends from the tube 11 into the container 18. The end of the tube 11 is clamped by a flange 21 to the end face of the container 18. A bracket 22 is clamped between the lower portion of the tube 11 and the lower portion of the container 18 with the bracket 22 being attached to a hitch bar 23. The hitch bar is also welded to a plate 24 which forms a rear end face of the container 18. A slide portion 25 of the hitch bar can be adjusted longitudinally by insertion of a pin 26 into one of a plurality of holes 27. The hitch bar 23 is arranged for connection to a suitable support coupling indicated at 28 provided on a tractor vehicle (not shown).

The upper surface 19 of the container 18 has a mouth 29 in the form of a tubular member which is attached to the upper surface 19 around its periphery and extends upwardly therefrom. The axis of the tubular member defining the mouth 29 is arranged at a shallow angle inclined forwardly relative to the auger tube. The mouth 29 includes an upper open mouth which is substantially circular in shape and indicated at 30. The opening 30 lies in a plane at right angles to the axis of the tubular mouth 29 and thus is at a shallow angle to the surface 19. The shallow angle is chosen to approximate the working angle of the main auger tube so that when the main auger tube is at its working angle the opening 30 is approximately horizontal.

A side load auger generally indicated at 35 comprises an auger tube 36 and a flight 37 mounted upon a shaft 38. A lower end of the tube 36 is connected to a hopper 39 with a feed end 37A of the flight exposed within the hopper for collecting material dumped into the hopper for feeding along the auger 35.

The upper end of the tube 36 is connected to a downwardly directed discharge spout 40 in the form of a tubular member into one side of which an upper end of the tube 36 breaks out. The tubular discharge duct 40 has an open upper end 41 which is closed by a removeable cover 42 having a handle 43. The lower open end of the tubular member 40 indicated at 44 is arranged to discharge into the open upper end of the tubular mouth 29. For this reason the diameter of the tubular member is arranged to be slightly less than that of the mouth 29. The tube 36 is connected to the tubular member 40 at a shallow downwardly directed angle so that in a normal working position of the feed auger 35 with the hopper resting upon the ground, the tubular member 40 has its axis approximately vertical. A bell-shaped shroud 45 is welded onto the outer surface of the tubular member at a position approximately half way down the tubular member and extending outwardly and downwardly therefrom to a position outside the opening 30 of the mouth 29. The shroud or skirt 45 thus acts to protect the opening 30 against the entry of rain and other contaminants and helps confine the material to properly feed from the discharge spout into the container.

The auger system described above is mechanically driven by a mechanical connection to the PTO shaft generally indicated at 50 of the tractor vehicle. The PTO shaft is connected by a coupling member 51 to a splined shaft 52 of the drive mechanism. The coupling member 51 includes a pair of universal joints 53 and 54 together with an extensible shaft connection 55 thus enabling the coupling to connect between the drive mechanism of the auger system and the PTO shaft of the tractor regardless of the specific geometry of the tractor. A conventional connector is indicated at 56 for connecting the inner end of the coupling 51 to the splined shaft 52. The shaft 52 is directly coupled to or is integral with the shaft 13 of the main auger flight. The shaft is supported in lower bearings 57 and 58 mounted on plates 59 and 60 respectively. The plate 59 is clamped to the end plate 24 of the container 18. The plate 60 is supported parallel to the plate 59 at a position spaced therefrom by bolts 61 and sleeve spacers 62.

A second shaft 63 is similarly mounted on bearings 64 on the plates 59 and 60 so as to lie parallel to the shaft 52. A third shaft 65 is also mounted on bearings 66 on the plates 59 and 60 and again is parallel to the shafts 52 and 63. The shaft 65 is splined similarly to the shaft 52. As best shown in FIG. 3, the shaft 65 is offset to one side of the shafts 52 and 63 and is positioned approximately at the mid height between those shafts. A chain 67 extends around sprockets 68 and 69 mounted on the shafts 52 and 63 respectively so the drive from the shaft 52 is communicated from the sprocket 68 through the chain 67 to the sprocket 69 and thus to the shaft 63. During normal driving action, the shaft 65 is merely an idler shaft and carries a sprocket 70. However it is also possible to remove the coupling 56 from the shaft 52 and to place it onto the shaft 65 in which case rotation of the PTO shaft acts to drive the shafts 63 and 52 in reverse direction.

The plates 59 and 60 are covered by an arch shaped cover member 71 which has a shape corresponding substantially to the outer periphery of the plates so that the cover member can lie over the plates and extends forwardly therefrom as a shroud to cover the moving parts. The cover member 71 is attached simply by a lug 72 which connects over a nut on the rear end of the uppermost one of the bolts 61. The cover member 71 includes a recess 73 and a latch mechanism 74 for receiving the coupling 51 when it is moved into an upright position from the drive position shown in FIG. 1. The latch mechanism 74 includes a transverse pin 75 which can be removed and replaced to latch the coupling 51 in the raised position for storage of the device when it is not in operation.

The drive from the shaft 63 to the shaft 38 of the feed auger is provided by a first and a second right angle gear box 80 and 81. The first or lower right angle gear box 80 as shown in FIGS. 1 and 2 is mounted upon a side plate 82 which extends across the tubular mouth 29. The right angle gear box is bolted to the plate 82 at a raised centre portion of the plate 82. On either side of the raised centre portion, the plate is recessed and extends outwardly to the edges of the tubular mouth 29 to which it is welded at points 83 as indicated in FIG. 2. The right angle gear box 80 is therefore fixed in position inside the container and sits substantially centrally of the container in the open mouth 29.

The second or upper gear box 81 is mounted on a pair of plates 84 and 85 which extend from one side of the gear box outwardly toward a side of the tubular spout 40 which is remote from the auger tube 36. The plates 84 and 85 are welded to the tubular spout 40 at points 86 and 87 respectively. The plates are bolted to the sides of the gear box 81 by bolts 88. The gear box 81 is thus supported in fixed position relative to the tubular discharge spout 40 centrally of the spout and aligned with the shaft 38 of the feed auger.

The gear box 80 includes an input shaft 90 which is coupled to the shaft 63 by a universal coupling 91. The gear box 80 has an output shaft 92 at right angles to the shaft 90 which is connected to an input shaft 93 of the gear box 81 via a universal coupling 94. The gear box 81 has an output shaft 95 which is connected to the shaft 38 of the feed auger by a universal coupling 96. The shaft 90 extends through a hole in the side of the tubular mouth 29.

Drive to the flight 37 of the feed auger is therefore provided by the mechanical system including the chain drive from the shaft 52 to the shaft 63. The shaft 63 drives the input shaft 90 of the gear box 80 which in turn drives the input shaft 93 of the gear box 81. The output shaft of the gear box 81 directly drives the shaft 38 of the flight 37. There is therefore a direct mechanical connection between the drive to the main auger shaft from the shaft 52 to the drive to the shaft 38. The ratio of the gear boxes 81 and 80 can be varied by suitable adjustment mechanism to accommodate differences of feed material but it will be appreciated that the speed of rotation of the shaft 38 and the shaft 13 are correlated and remain at a constant ratio so that the feed from the feed auger can be adjusted to properly maximize the feeding rate of the main auger. Reverse drive to the augers for cleaning of any blockage or for unloading can be obtained simply by connecting the drive from the coupling 51 to the splined shaft 65.

In addition the physical support for the discharge spout 40 relative to the container 18 is provided by the coupling between the gear boxes 80 and 81. The gear boxes are maintained at a substantially fixed distance apart and each is fixed inside the respective portion of the auger system. The spout and the container are thus held apart at the required distance but the universal coupling 94 allows pivotal movement of the feed auger relative to the main auger for movement of the hopper around the lower end of the main auger and for movement of the hopper and feed auger to a stored position (not shown). Uncontrolled twisting of the spout relative to the container is prevented by ground wheels (not shown) on the hopper so that the lower end of the hopper is located on the ground on two spaced points to hold it at a required angle and the coupling between the gear boxes provides a third point of support. When the hopper is removed from the ground for movement to the storage position, the feed auger can be lifted by cable system which suspends the hopper from the cable system at a suitable angle so that it hangs from the cable at one end and is supported on the linkage 94 at the other end thus maintaining it at or approximately at a required angle to prevent jamming of the discharge spout within the container.

The geometry of the shroud 45, the lower end of the spout 40 and the plate 82 are best shown in FIG. 1 so that the spout can twist with three different degrees of movement provided by the universal joint 94 and by rotation of the gear box 81 about the axis of the output shaft 92. The recessed parts of the plate 82 thus allow the left hand side edge of the discharge spout to twist in a counter clockwise direction and the angled wall of the shroud 45 similarly allows this twisting movement without the upper edge of the mouth 30 contacting the angled wall of the shroud 45.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. An auger arrangement for transporting particulate material comprising a main auger having a main auger tube, a main auger flight mounted within the tube, a discharge spout at an upper end of the tube and a container surrounding an inlet portion of the main auger flight at a lower end of the tube, frame means for supporting the tube with said upper end raised relative to said lower end and for movement across the ground, a hitch member for connection of the lower end of the main auger tube to a tractor vehicle for movement of the main auger tube on said frame means by the tractor vehicle, drive coupling means for connection to a drive shaft of the tractor vehicle, first mechanical connection means communicating drive from said drive coupling means to said main auger flight, a feed auger having a feed auger tube, a feed auger flight, a hopper at a feed end of the feed auger tube for receiving the particulate material and a downwardly depending discharge spout at a discharge end of the feed auger tube, means mounting the feed auger tube on the main auger such that the discharge spout of the feed auger tube is arranged to discharge into the container for feeding the main auger flight, the mounting means being arranged to allow pivotal movement of the feed auger tube relative to the container, and second mechanical connection means communicating drive from said drive coupling means to said feed auger flight comprising a first gear box mounted inside the discharge spout in fixed position relative thereto having an output shaft connected to said feed auger flight for driving said feed auger flight and an input shaft at an angle to the output shaft thereof, and a second gear box mounted inside the container in fixed position relative thereto having an input shaft and an output shaft at an angle to the input shaft thereof, first drive coupling means for communicating drive from said drive coupling means to said input shaft of said second gear box and a second drive coupling means for communicating drive from said output shaft of the second gear box to said input shaft of the first gear box, the second drive coupling means being arranged to allow pivotal movement between said first gear box and said second gear box to accommodate said pivotal movement of the feed auger tube relative to the container.

2. The invention according to claim 1 in the second drive coupling means provides physical support for the discharge spout relative to the container.

3. The invention according to claim 1 wherein the output shaft of the second gear box is connected to the input shaft of the first gear box by a universal joint coupling.

4. The invention according to claim 1 wherein the first drive coupling means comprises a chain drive system having a housing fixedly mounted relative to the main auger tube and including a first shaft directly connected to said drive coupling means, a second shaft parallel to the first shaft, a drive chain and sprocket system for driving the second shaft from the first shaft and means for driving said input shaft of said second gear box from said second shaft.

5. The invention according to claim 4 wherein there is provided a universal joint coupling between said second shaft and said input shaft of said second gear box.

6. The invention according to claim 4 including a third shaft parallel to said first and second shafts and having sprocket means thereon cooperating with said drive chain and arranged such that rotation of said third shaft in the same angular direction as the first shaft causes rotation of said second shaft in a reverse direction for reversing said feed auger flight.

7. The invention according to claim 1 wherein the first gear box is mounted inside the discharge spout for direct connection to a drive shaft of the feed auger flight, wherein the second gear box is mounted inside the container, wherein there is provided first bracket means connected to an inside surface of said discharge spout for supporting said first gear box in fixed position relative to said discharge spout and second bracket means mounted on an inside surface of said container for supporting said second gear box in fixed position relative to said container and wherein the second drive coupling means provides physical support for the discharge spout relative to the container.

8. The invention according to claim 7 wherein the output shaft of the second gear box is connected to the input shaft of the first gear box by a universal joint coupling.

9. The invention according to claim 4 wherein the housing comprises a first plate fixedly mounted to an end of said container adjacent said drive coupling means, a second plate parallel to said first plate, said drive chain and sprockets being mounted between said first and second plates and a removeable cover member in the form of an arch-shaped plate portion surrounding the edges of said plates.

10. The invention according to claim 9 wherein the cover member includes a recess and wherein the drive coupling means includes a shaft for connection to said tractor vehicle, said shaft being pivotally mounted relative to said second mechanical connection means, said recess being arranged to receive said shaft in a raised position thereof and latch means for latching said shaft in said raised position for storage.

11. The invention according to claim 1 wherein the discharge spout projects into an open mouth of the container and wherein there is provided a skirt mounted on the discharge spout and having an outer periphery for surrounding the open mouth of the container.

* * * * *